United States Patent [19]

Freudenschuss

[11] 4,297,732
[45] Oct. 27, 1981

[54] METHOD AND DEVICE FOR LOCATING A SOUND EVENT ON A MAGNETIC TAPE

[75] Inventor: Otto Freudenschuss, Vienna, Austria

[73] Assignees: Karl Vockenhuber; Raimund Hauser, both of Vienna, Austria

[21] Appl. No.: 42,690

[22] Filed: May 25, 1979

[30] Foreign Application Priority Data

Jun. 5, 1978 [AT] Austria ............................. 4045/78

[51] Int. Cl.³ .................... G11B 15/18; G11B 19/02
[52] U.S. Cl. ................................. 360/72.1; 360/74.1
[58] Field of Search .................. 360/72.1, 72.2–72.3, 360/74.1, 74.4, 137, 13; 179/100.1 VC

[56] References Cited

U.S. PATENT DOCUMENTS

| 3,714,382 | 1/1973 | Sykes ............................. 360/72.2 |
| 3,852,814 | 12/1974 | Johnson et al. ............... 360/72.1 |
| 4,095,732 | 6/1978 | Merritt .......................... 360/72.3 X |

FOREIGN PATENT DOCUMENTS 48-5485 2/1973 Japan ................................. 360/72.1

Primary Examiner—John H. Wolff
Attorney, Agent, or Firm—Martin A. Farber

[57] ABSTRACT

A method and device for coordination of a signal to a sound event stored on a magnetic tape or the like, particularly for signalizing and locating the sound event. A tape drive device is operatively coupled with a counter. The sound playback is started, and when the user recognizes the sound event, the counter, in functional relationship with the tape transport, is activated. After a certain time interval or upon the occurrence of a counter value, the magnetic tape is shifted back and a repeated playback begins. Upon attaining the count condition ("O") the counter turns on a signal device providing a marking location signal. Upon a non-correspondence in time of the location signal with the sound event, the count condition of the counter, and thus the location signal, can be charged relative to the sound event, and the location signal is used for positioning the sound event with respect to a reference point on the device.

26 Claims, 7 Drawing Figures

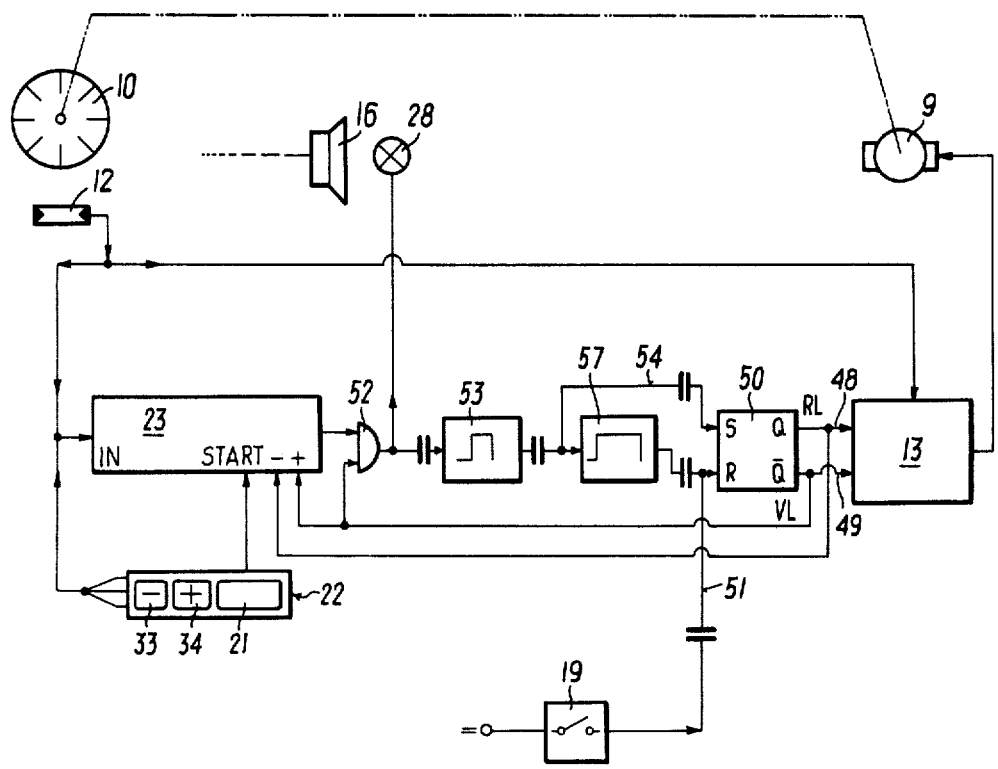
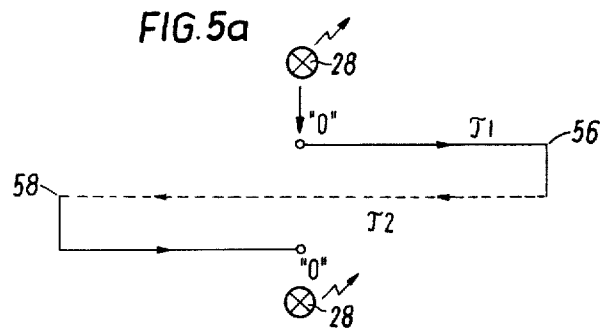

METHOD AND DEVICE FOR LOCATING A SOUND EVENT ON A MAGNETIC TAPE

The invention relates to a method for coordination of a signal to a sound event which is stored on a magnetic tape or the like, particularly for signalizing and locating, respectively, the beginning and/or the end of the sound event.

Further the invention relates to a device for performing this method with at least one drive device for the transportation of a magnetic tape in the forward running direction and reverse running direction, whereby a control device for automatic playback—repeat operation for at least one partial range of the magnetic tape is coordinated to the drive device for the magnetic tape and with a playback amplifier for the sound event, which playback amplifier is connected to a sound head.

Particularly for the cutting, fading-in, mixing, etc., of a sound event (which is already recorded on a magnetic tape) with an additional sound event, for re-recording of information (which is stored on a magnetic tape) onto a sound film during the addition of the sound, it is absolutely necessary for the user of the device to clearly locate each tape position at which the sound event, and respectively, the spaces between two already recorded sound events begin. This tape position, depending upon the manipulation which is aimed at with the device, is to be precisely positioned in front of the recording sound head or the playback sound head of the magnetic tape unit. This can be carried out only empirically, whereby particularly with sound cassette devices according to experience, scarcely can a satisfactory positioning be achieved even for the skillful amateur. Beyond that under the circumstances the starting time for the magnetic tape transport devices still must be taken into consideration.

From the German Auslegeschrift 1,117,325 a running control device for magnetic tape devices is known, which has a control device with which the manner of operation of the device is automatically and cyclically changed over. For this purpose preset counters are provided, with which predetermined counters actuate control contacts. By these known measures, particularly in the field of data processing, recordings are automatically reproducible many times, so that different evaluations are able to be performed sequentially in time. The coordination of a marking to a certain freely selectable recording from time to time is not possible.

The invention is based on the object to provide a method, and respectively, a device with which a marking in the form of a signal can be coordinated exactly to a sound event which is stored or recorded on a magnetic tape.

According to the invention with a method of the introductory mentioned type it is proposed that the playback of the sound event is started and when the user recognizes the sound event a counter device (23) for a physical value which is derived from the tape transport is activated, that after, preferably a definite time interval, respectively, upon the occurrence of a physical value which stands in functional relationship with the time interval, the magnetic tape (2) is shifted back at least to the range of the sound event and a repeated playback of the sound event is started, whereby the counter device (23) is coupled in a fixed relationship with a tape drive device (7, 8, 9) with preferably all operating modes, at least with the operational modes forward running/playback and reverse running, and that upon attaining the count condition ("0") of the counter device (23) by its activation a signal device is turned on, according to which, with a non-correspondence in time of the location signal with the sound event, and respectively, with the beginning and/or end of the sound event, under the circumstances if necessary from time to time, the count condition of the counting device (23) can be changed particularly gradually or step by step preferably by the user, preferably in the sense of a shortening of the time interval between the location signal and the sound event, and the location signal is used for the positioning of the sound event, and respectively, of the magnetic tape (2) with respect to a reference point on the device, for example a recording head and/or playback head (5).

By the device for carrying out this method according to the invention with the device mentioned in the second paragraph herein, it is proposed to provide a memory or storage device (23), the storage content of which by means of a switching-on device (21) can be brought by the user in functional relationship with the sound event with reference to the tape feed amount, whereby the storage content, preferably at the moment of the functional unison connection with the conveyance of the tape, particularly with the playback—repeat operation, can be transformed into a control signal for the activation of a signal device (28), the signal emission of which is provided as a location signal, and a device (22) for the arbitrary, under the circumstances, preferably gradual or step by step variation of the storage content by the user with respect to the tape position of the sound event is in operative connection with the storage device (23).

By these particular measures it is achieved that by relatively simple manipulations on the device, a sound event can be located, whereby the cutting of the recording and synchronized re-recordings onto a movie picture film not only are simplified, but rather also are first practicably made possible. Essentially by a type c⁻pendulum operation of the tape position or location of interest, the location signal is coordinated to the sound event.

The invention is not only useable for magnetic tape recording or storage, or acoustical information, but also for the recording or storage of video signals, whereby advantageously the use of the invention with longitudinal recording of video signals is advantageous.

Further in accordance with the invention a counter (23) is provided for a parameter (which stands in functional dependency with the tape transport), such as units of length of the transported magnetic tape (2), revolutions of one or several capstan spindles (7), revolutions of the winding or unwinding spool (3, 4) of the magnetic tape (2), etc., which counter is activatable by means of a button or switch (21), respectively, and is coupled with the tape transport, the counter has a first output (29) which is coordinated preferably to a high count condition ("+20") and its output signal for the control of the drive reversing device (20) for the tape transport is fed to the latter, the counter (23) has a second output (32) which preferably is coordinated to a lower count condition ("−20"), than the counter condition ("0") initiated upon activation of the counter and its output signal likewise is fed to the drive reversing device (20) for its control and preferably to a switch-on device for the playback devices (5, 15, 16, 17) of the recorded sound event for their activation, and the counter (23) has a third output (27) which is coordinated to the counter condition ("0"), which counter condition ("0") according to the amount is provided preferably between the counter conditions ("+20"and "−20") of the first and second outputs (29, 32), whereby the signal which is derived from the third output (27) is provided for the activation of the signal device (28).

Further in accordance with the invention a counter (23) is provided for a parameter (which stands in functional dependency with the tape transport), such as units of length of the transported magnetic tape (2), revolutions of one or several capstan spindles (7), revolutions of the winding or unwinding spools (3, 4) of the magnetic tape (2), etc., which counter is activatable by means of a button or switch (21), respectively, and is coupled with the tape transport, an output is provided preferably coordinated to the counter condition ("0") upon the activation of the counter (23) and which is provided for triggering the signal device (28) for the marking, a first, preferably electronic timing element (53, τ1) is provided, which is controlled by an output of the counter (23), and its output signal on the one hand for initiating the drive reversal of the magnetic tape (2) is fed to the control device (50) for the playback—repeat operation, and its output signal on the other hand is provided for triggering a second, preferably electronic timing member (57, τ2), the output signal of the latter likewise for the drive reversal of the magnetic tape (2) is fed to the control device (50) for the playback—repeat operation.

Still further for the correction of non-correspondence in time of the marking signal with the sound event, a setting device (22, 33, 34) is provided for the counter (23) by means of which the counter condition is changable.

Yet with the invention the marking signal for the positioning of the magnetic tape (2) is fed as a control signal to a control device for the transport devices of the magnetic tape (2).

Further in accordance with the invention the recording- and/or playback-head (5) of the magnetic tape device (44) is or are, respectively, provided as devicesided reference point(s) for the location signal for the positioning of a tape location of the magnetic tape (2).

Still further a substantially lower speed than the playback transport speed is provided for the positioning of the magnetic tape (2).

According to another feature of the present invention the time constant (τ1) of the first timing member is shorter than the time constant (τ2) of the second time member (57), preferably half as long.

Still further a pulse retarding or delay stage (τ) is coordinated preferably to each input of the drive reversing device of the control device (20) for the transport devices of the magnetic tape device, while during its delay time the setting device (22, 33, 34) for the counter condition of the counter (23) is activatable.

Another feature of the present invention is that a light signal source (35, 36) is able to be activated over the time period of the delay time of the delay stage, by means of which light signal source the possibility of correction of the coordination of the location signal to the sound event is indicated.

With the above and other objects and advantages in view, the present invention will become more clearly understood in connection with the detailed description of preferred embodiments, when considered with the accompanying drawings of which:

FIG. 1a schematically shows a compact magnetic tape cassette together with the corresponding sound heads;

FIG. 1b shows the course of the magnetic tape during the coordination of a marking;

FIG. 2 schematically shows in block diagram a circuit arrangement for the coordination of a location signal together with a perspective view of associated mechanical parts;

FIG. 5 is a block diagram of a further embodiment of the invention; and

FIG. 5a illustrates a tape course diagram for FIG. 5.

Figure 1A:
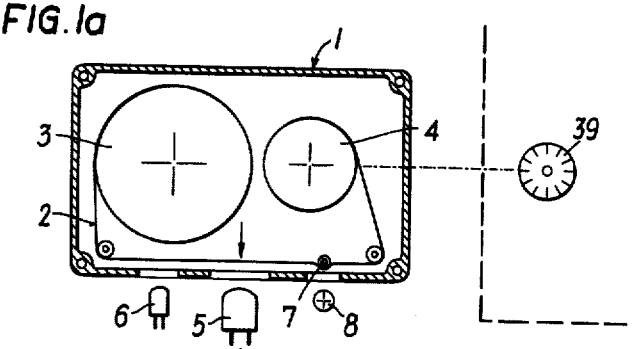

FIG. 1a shows a magnetic tape cassette 1 of the compact cassette type by which the magnetic tape 2 is led from a supply spool 3 over turnaround deflection rollers (not designated) to the wind-up spool 4. By means of a window or opening (not designated) in the wall of the cassette the recording/playback head 5 and the erase head 6 engage the magnetic tape 2. The transport movement of the magnetic tape 2 is brought about by means of a capstan drive which is formed from a capstan spindle 7 and a capstan idler 8.

Figure 2:
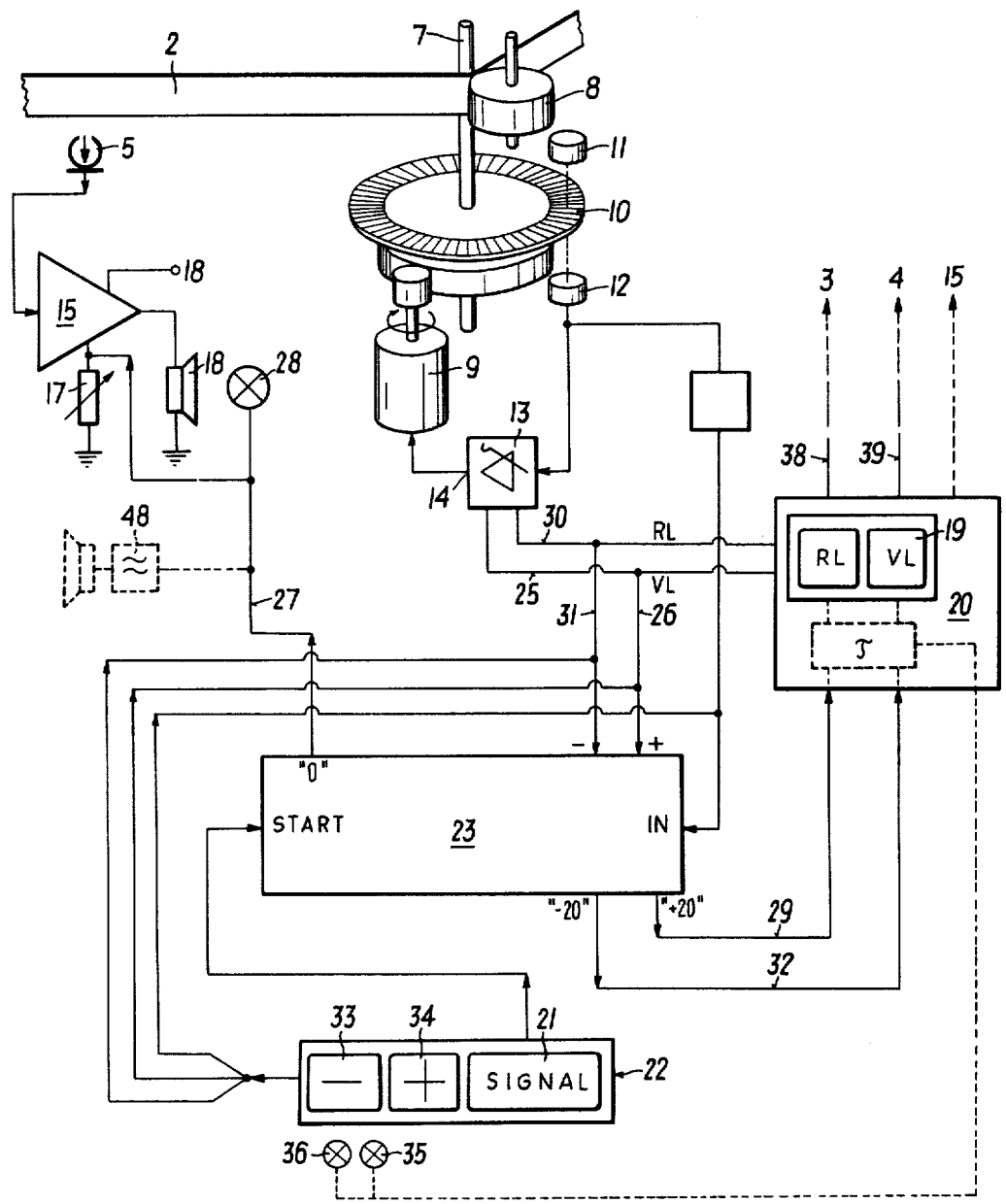

The transport of the magnetic tape 2 must take place with uniform speed, for which as evident from FIG. 2, a rpm rotational speed control device is coordinated to the electromotor 9 for driving the capstan spindle 7 of the capstan drive. This rpm control device has a cross line disc 10 coupled rigidly with the capstan spindle 7, the cross line markings of which disc are arranged in the light beam path of a photoelectric device, the latter being formed of a light source 11 and a photoelectric transformer 12. The signal frequency of the photoelectric transformer 12 thereby is in functional relationship with the transport speed of the magnetic tape 2 and is fed to a rpm rotational speed pick-up or transmitter 13. The rpm transmitter 13 compares the signal frequency which is derived from the photoelectric device 11, 12 with a frequency corresponding to the nominal speed of the magnetic tape and via its output 14 feeds a corresponding signal to the electromotor 9.

The sound event recorded on the magnetic tape 2 is read by the playback head 5, which head is connected to a low frequency amplifier 15. To the output of the low frequency amplifier 15 there is connected a loud speaker 16, the loudness of which is adjustable by means of a potentiometer 17. Moreover the amplifier 15 has an output 18 of lines via which for example the recording of the tape can be sent to an additional sound tape, a sound film projector or the like.

If now for example the beginning of an already recorded music piece is intended to be located with respect to a corresponding system, i.e., thus for the start of the playback operation of the magnetic tape unit, the button 19 of the operating mode control device 20 is to be actuated. In doing this the playback amplifier 15 is also switched on and as soon as the sound event which is to be located is able to be heard over the loud speaker 16 for the user, the user actuates the contact switch 21 of the location matching control setting device 22. In this manner the counter device 23 is activated, whereby the signal (that is derived from the markings of the disc 10) of the photoelectric transformer 12 is used as a counting pulse. The pulse frequency is selected very high in the sense of a good control of the rotational speed of the sound shaft 7. For locating the sound event, however a relatively small pulse frequency is sufficient, particularly if the device is used for the re-recording of the sound events on for example a super-8 amateur film projector. In such a type of film projector the moving picture film conventionally is transported with a picture frequency of 18 pictures per second. This means that it suffices to supply the pulses to the counter device with a pulse series frequency of 18 Hz. In this manner the counter device is kept small in its electronic component expense and nevertheless a sufficient synchronism can be produced between the picture scene and the sound event. A frequency divider 24 is provided for the transformation of the relatively high cross line marking frequencies of the disc 10 to the low film picture frequency.

By the initial actuation of the button 19 of the operating mode device 20 (forward movement) over the lines 25, 26 the rotational speed control device 13 for the electromotor 9 is activated in the corresponding sense and the counter device 23 is set to the operating mode "forward counting". The counter condition "0" is associated with the beginning of the counting operation of the counter device 23 and occurs when the user presses the button 21. The corresponding output 27 of the counter device 23 activates an optical signal device in the form of an incandescent lamp 28, the light emission of which is provided as a location or correspondence comparison matching signal. From FIG. 1*b* likewise the lamp 28 may be seen, which is activated at the beginning of the counter operation in the forward direction of the magnetic tape 2.

The forward operation of a magnetic tape device is maintained until the counter condition "+20" is reached. An output 29 of the counter device 23, which output is associated with the counter condition "+20" is connected with the operating mode control device 20 and initiates the reverse running operational mode. By doing this a corresponding control signal is fed via the line 30 to the rotational speed control device 13. Via the line 31 the counter device 23 is switched over to the operational mode "counting backwards".

Figure 1B:
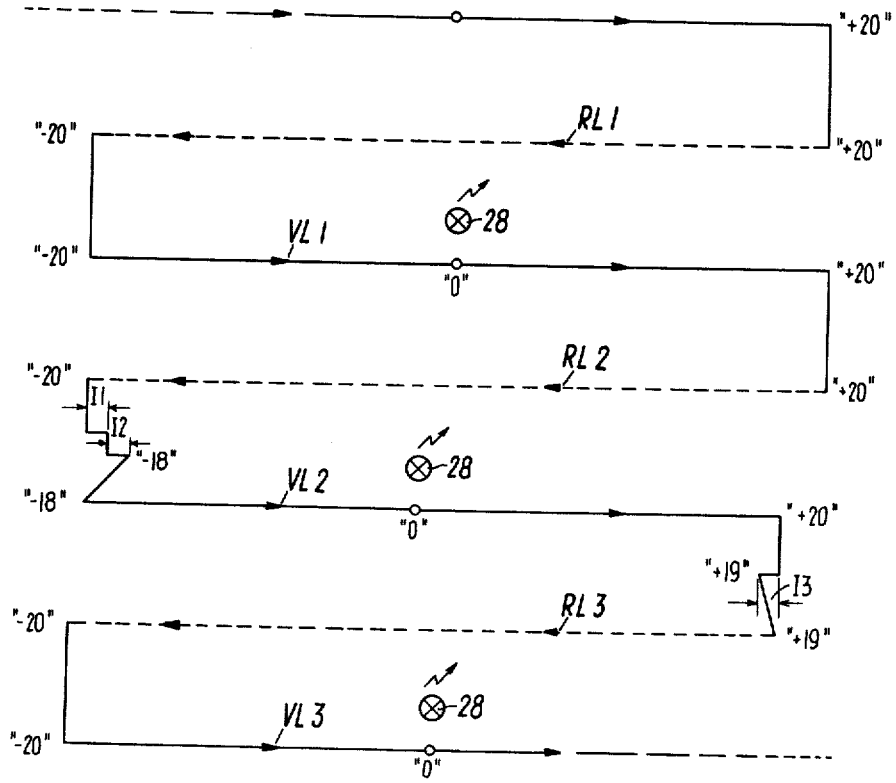

The magnetic tape then runs according to the dashed lines RL 1 in the reverse direction, and indeed until the counter condition "−20" is reached. An output 32 of the counter device 23, which output is associated with the counter condition "−20" now reached sends a control signal to the operational mode control device 20, by which signal moreover the operational mode forward starts with playback of the recorded sound event. In FIG. 1*b* this schematic course is designated with VL 1. During the forward running VL 1 the user of the device hears the tape 2 over the loud speaker 16 according to FIG. 2.

In doing this via line 26 the counter 23 is set to the operating mode "forward counting" and counts, starting from the counter condition "−20" beyond the counter condition "0" again up to the counter condition "+20". During this operation when reaching the counter condition "0" according to FIG. 2 the signal lamp 28 is activated. Simultaneously yet the user becomes aware by hearing the sound event and he can now determine and estimate with use of the senses of hearing and sight whether the location signal by the emission of the light source 28 actually has been at the moment of the occurrence of the sound event. On the basis of the physiologically conditioned reaction time the signal emission of the light source 28 will be perceived during the forward running VL 1, with the greatest probability, later than the sound event at the playback sound head 5. This means that a correction of the coordination of the light signal with respect to the sound event must be made.

Afterwards during the forward running VL 1 again the counter condition "+20" is reached, by the operating mode switching device 20, the reverse motion RL 2 starts until the counter condition "−20" is again reached. But if the user of the device has determined that the marking signal occurred too late, for the correction of the error he for example sets the activation of the signal lamp 28 ahead by two count pulses for the counter device 23. These pulses are applied manually by the user to the device and indeed by one or by multiple actuation of one of the buttons 33 or 34 of the location matching control device 22. A one time actuation of the button 33 reduces the counter condition of the counter device 23 by one counter value. In this described case thus the button 34 for the increase of the counter condition is actuated twice, as this is shown by the pulses I1 and I2 in FIG. 1*b*. By this the counter condition "−18" is set, beginning from this count, now the tape transport is carried out in the again repeated playback operation VL 2. The counter condition "0" now is reached earlier already namely by two counter values by as a result of the manual input of the pulses I1 and I2, whereby the light source 28 correspondingly lights up earlier. Since simultaneously the magnetic tape is acoustically listened to, again the user determines whether there occurs a time correspondance of the sound event with the light emission of the light lamp 28. If or example now the user of the device has determined yet during the forward running VL 2 that now the lamp 28 was activated before the occurrence of the sound event, that is the location signal is coordinated too early, then another correction is necessary. In order now to set the location signal later, the button 33 is actuated, which has the result that the counter condition at the end of the forward running VL 2 is reduced to the value "+19" (pulse I 3). The reaching of the counter condition "+20" again causes the reverse running VL 3 of the magnetic tape up to the counter condition "−20", whereupon again the playback operation is started in the forward running VL 3.

Upon reaching the counter condition "0" again the lamp 28 is automatically switched on and indeed in comparison to the switching on during the forward run VL 2 by one pulse—I 3—later, whereby the user again determines if correspondance exists, and in our example the user finds that now time correspondence between the location signal and the occurrence of the sound event to be located exists. Thus a firm stable coordination between the counter content and the magnetic tape is provided so that in a simple manner thus for example the beginning of a music piece or the like is determinable and positionable repeatedly. With the positioning with this embodiment, the gap from the playback head 5 is used as the reference point.

With the circuit arrangement according to FIG. 2 consideration was taken to use a counter device 23 with relatively few counter stages, so that it was necessary to perform a change of the counter condition for the purpose of correcting the coordination of the marking signal solely upon reaching the counter condition "+20" or "−20", whereby yet the condition is given that upon reaching the counter condition "+20" only a reduction and upon reaching the counter condition "−20" only an increase may be provided. For this a counter with 40 counter stages is found to be adequate. In order however to simplify the operation in this sense for the user of the device, in the operating mode control device 20 a timing member τ is coordinated to the signal paths of the counter outputs "+20" and "−20". By means of the timing member the magnetic tape stops after reaching the counter conditions "+20" and "−20" over a certain length of time (for example over 10 seconds) and only thereafter does a drive in the opposite direction start. Simultaneously from the time member respectively each one of the signal lamps 35, 36 is controlled or triggered, which lamps respectively are coordinated to one of the correction buttons 33 and 34. Analogously the signal lamp 35 which corresponds to the button 34 lights up only when the counter and magnetic tape, respectively, are in such a position that an increase of the counter condition is possible. The signal lamp 36 lights up upon reaching the other end position, namely when a lowering of the counter condition is possible. Moreover by the operating mode control device 20 via the outputs 37 and 38 also the not illustrated winding device for the unwinding and winding-up spools 3, 4 according to FIG. 1a is controlled. Whether the capstan motor 9 is driven or not, during the reverse running, depends per se on the construction of the magnetic tape unit. Fundamentally however with the embodiment according to FIG. 2 it is necessary during the forward running as well as during the reverse running with the positioning of the marking for the capstan idler 8 to firmly engage against the magnetic tape 2 and on the capstan spindle 7, respectively. If during the reverse running the motor 9 is turned off, that is no signal feed occurs over the line path 30 to the rotational speed control device 13, thus the not illustrated (reverse) winding drive must be used for the reverse transport of the magnetic tape. Beyond that a so-called double capstan drive is conceivable by which respectively each one capstan spindle is provided on both sides of the record/ and playback sound head according to FIG. 1a. In that case one would then need to think of the capstan motor 9 in place of the not illustrated other capstan drive.

In FIG. 1a also inside of the dashed frame, a disc 39 which is provided with cross-line markings is shown, which disc stands positively in operative connection with the winding-up spool 4. This disc 39 with the cross-line markings can be used instead of the disc 10 according to FIG. 2, whereby it is then possible that the capstan drive 7, 8 and 9 during the reverse running phase can be brought completely out from the operative position, that is lifting off of the capstan idler 8. In doing this however care is to be taken that the cross-line marking disc 39 is dimensioned such that by means of the photoelectric device 11, 12 which is also used, even with low winding speed of the winding-up spool 4, that is thus with a large winding core or hub diameter, a sufficiently high frequency of the cross-line markings is achieved, in order to be able to coordinate at least one pulse for example to a film picture of a sound film to be added with sound.

The counter device 23 can also be formed such that the physiological reaction time of the user is eliminated by being preprogrammed, which can take place in the manner that the signal for activation of the lamp 28 already is provided before reaching the counter condition "0". The value of this time shifting ahead can be ascertained under the circumstances if necessary by the user of the device even for a first coordination of a location correlation and if necessary under the circumstances it can be fed-in via a coding switch for the later operation.

Figure 3:
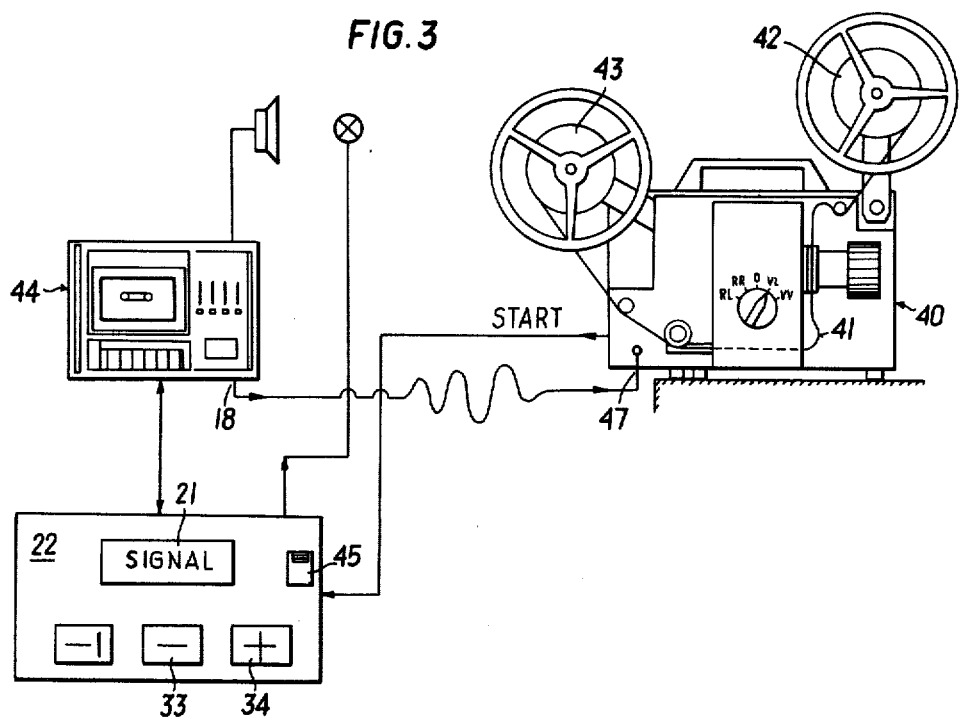
FIG. 3 illustrates likewise schematically the arrangement of a device according to the invention with a sound film projector for the synchronous passing of sound events to the sound film.

FIG. 3 schematically illustrates the combination of an amateur sound film projector 40 with a cassette magnetic tape unit which is equipped with the device according to the invention. The movie picture film 41 is transported from one supply spool 42 to the winding-up spool 43 for example with a picture speed of 18 pictures per second. The magnetic tape cassette unit 44 has the playback loud speaker 16 and the marking control device 22 with the buttons 21, 33 and 34 according to FIG. 2. By means of the switch 45 which is not illustrated in the circuit arrangement according to FIG. 2, the entire location matching control device can be switched on and off. The location of the tape position also takes place with a signal lamp 28. With the device for the coordination of a location, the passing of a noise to the sound film 41 is intended to occur. Let us assume for example that we have a scene in which a car door is to be slammed. With this, particularly with such spontaneously occurring noises, it is of significance that timewise correspondence and agreement exists between the picture operation and the sound event. The noise of the slamming of the car door is fed as a sound event on the magnetic tape in the cassette of the device 44. On the basis of the method described in FIGS. 1 and 2 the beginning of this noise is located, and indeed in the sense that the location signal signalizes the positioning of the beginning of the noise at the playback head. Thereafter the movie picture film in the movie picture projector 40 is to be transported such that the picture at which the noise occurs for the first time is brought in front of the picture gate aperture. In the case of the slamming of a car door, this is the picture in which the car door snaps in the lock. The sound projector 40 has an automatic starting device, with which as well as a magnetic tape device it is started with a "flying start" and when the continuous transport speed of the movie picture film 41 is already reached, the sound recording device of the projector 40 (erase oscillator, recording amplifier, etc.) is switched-on. In this manner a nearly smooth (jointless) and wow-free indication of information is possible. Such a device is described for example in Austrian Pat. No. 247,151.

Figure 4:
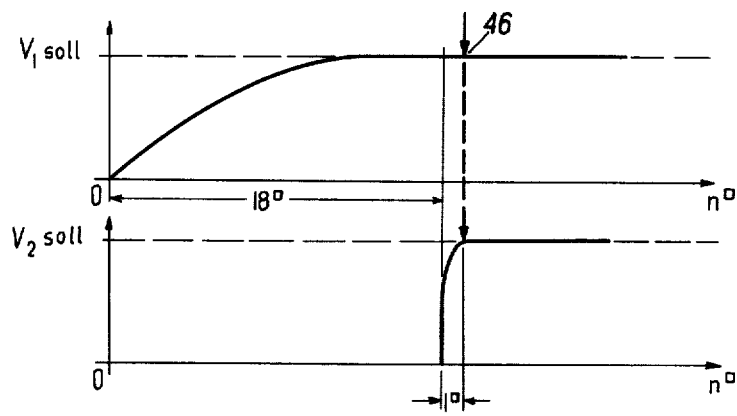
FIG. 4 shows a graphical diagram for the arrangement according to FIG. 3.

After the individual picture of interest has been brought in front of the picture gate aperture of the projector 40, the starting device is activated, whereby the movie picture film is transported backwards. This reverse transporting extends to about 19 to 20 individual pictures or frames. Depending upon the starting time of the drive devices of the magnetic tape unit 44, yet even the magnetic tape unit is to be placed timely into operation, that is before the beginning of the actual sound addition to the movie picture film. According to the diagram according to FIG. 4 it is assumed that the starting time for the transport devices of the movie picture film in the projector 40 is about one second, thus 18 pictures until the continuous transport speed V 1 is to be reached. With a magnetic tape device, particularly with devices without a mechanical flywheel mass, the starting time is extremely short. First class devices already reach their desired tape running speed in fractions of seconds. The magnetic tape devices according to FIG. 3 can be placed in operation consequently substantially later than the film projector 40. It is fully sufficient to switch on the transport devices of the magnetic tape unit 44 only immediately before the beginning of the re-recording operation, that is thus during the last, and respectively, 19th picture of the forward running of the automatic starting device of the projector 40. The correspondence of picture and sound according to the diagram according to FIG. 4 occurs at the moment 46. Since the magnetic tape device still must be placed in operation when even only immediately before the moment 46, the marking of the recorded noise, and respectively, the coordination of this marking must be shifted ahead, which can take place by actuation of the button 33 for the reduction of the counter condition (see FIG. 2) or by the extra button "−1" provided for this purpose. By this button the marking is shifted ahead so much that the starting occurs during the picture projection of an individual picture, which individual picture projection is immediately ahead of the (synchronous) moment 46. The sound signal is then fed via the output line 18 to the input 47 of the sound recording device of the projector 40. The automatic starting unit in this manner is also taken into consideration so much that the sound event can not arrive on the recording sound head from the range between the shifted ahead marking "−1" and the actual beginning of the sound event.

It would be conceivable to perform the start of the sound tape basically first at the moment of the synchronous point 46, particularly if the sound signal gradually fades-in by means of the automatic starting device, and respectively, the corresponding sound recording stages.

Basically it is possible to detect and indicate the location signal of the sound event not only by light emission, but also acoustically or mechanically. Thus it is thinkable that instead of the light emission, to emit a signal sound over the signal sound generator 48 which is illustrated in dashed lines in FIG. 2. Via the line 49 also the playback loudness of this sound event at the moment of the coordination can be raised discontinuously with respect to a spacial or position reference point (freely selectable: recording sound head, playback sound head etc.) and this level jump is evaluated as a marking. Finally it is thinkable, particularly with reel tape devices which are equipped with rearside-coated tapes, to provide even by mean of a pencil a dashed marking on the tape, whereby at this spot of the tape it can be mechanically cut and can be pasted or spliced with another tape piece. The markings can basically be set at the beginning or at the end or over the entire music piece, whereby in a simple manner with the marking over the entire length, first of all the beginning and end are marked and then by means of signals (derived from the beginning and end) of the counter outputs a bistable toggle or flipping stage is controlled, the latter being used for activating an optical, acoustical or mechanical signal device.

With magnetic tape devices which have a separate recording sound head and playback sound head and by which for example a new sound event is intended to be recorded in a gap between two sound events, consideration is to be given to the local position-wise off-setting of the recording sound head and the playback sound head, whereby the set marking then, likewise according to the position-wise off-setting, is to be shifted or off-set correspondingly.

In FIG. 5 a further embodiment of the invention for coordination of a location signal is illustrated by which the reversing of the tape drive does not take place via outputs of the counter 23, but rather by means of the output signals from timing members. The components and construction groups, respectively, according to FIG. 5, which correspond with the previously described embodiments, are designated with the same reference numerals. Electromotor 9 is controlled and triggered by the rotational speed control device 13 and moreover is provided with the cross-line marking disc 10 to which there is coordinated the photoelectric device with the photoelectric transformer (photo resistor 12). The rotational speed control device 13 has two control inputs 48, 49, to which there are applied the direct current signals for the determination of the sense of rotation for the electromotor 9 in the sense of a reverse running RL and a forward running VL of the magnetic tape. These control signals for the return running RL and the forward running VL are fed via a bistable flipping stage 50. To one input 51 of the flip-flop stage 50 via the switch 19 of the operational mode control device 20 there is supplied a control pulse for setting of the operational mode forward running (under circumstances from time to time if necessary with playback operation of the amplifying devices—which are not illustrated—for the recorded sound event). After actuation of the switching contact 19 the user of the device waits until he perceives the sound event of interest. Upon recognizing the sound event, furthermore, by means of actuating the button 21 of the location matching signal device 22, the counter 23 is placed into operation starting from the counter condition "0" and counting forward. As counting pulses, those pulses are used which come from the photoelectric transducer 12 by means of the cross-line markings of the disc 10. The signal lamp 28 is activated via the AND gate 52, which is connected to the output of the counter that is coordinated to the counter condition "0" and which AND gate is connected to the signal line of the input 49 (forward running VL) of the rotational speed control device 13. The signal lamp 28 represents the optical location signal. Simultaneously with the activation of the signal lamp 28 the monostable multivibrator or monoflop 53 with the dwell time τ 1 is turned on. At the end of the dwell time τ 1 of the monostable multivibrator 53, the input 55 of the bistable toggle or flipping stage 50 is triggered via the line 54, whereby a control signal is fed to the RL input 48 of the rotational speed control device 13, which control signal causes the reverse running of the magnetic tape. In the course diagram according to FIG. 5a the forward running from the counter condition "0" up to end of the dwell period τ of the monostable multivibrator 53 is drawn in solid line; the reversing or change over point from the forward motion VL to the reverse motion is designated with the numeral 56. Simultaneously with the change over to the reverse running RL of the magnetic tape drive devices (motor 9 etc.), also the monoflop (monostable multivibrator) 57 with the dwell time τ 2 is activated. The dwell time τ 2 of the monostable multivibrator 57 is to be selected at the very least larger than the dwell time τ 1 of the monostable multivibrator 53, in order to guarantee that the magnetic tape is transported back so far, and respectively, the tape position of interest is led in the tape running direction in front of the playback head of the magnetic tape unit, such that the tape position that is to be located actually can be acoustically perceived. Advantageously and as indicated in the embodiment, the dwell time τ 2 of the monoflop 57 is selected twice as long as the dwell time τ 1 of the monostable multivibrator 53. The return or reverse running is indicated in FIG. 5a by the dashed lines. At the end of the dwell time τ 2, by means of the output pulse of the monostable multivibrator 57, the triggering of the input 51 of the bistable flipping or toggle stage 50 occurs, which has the result that the magnetic tape again is driven in the forward motion direction VL. The reversing or change over point is designated in FIG. 5a with the numeral 58. During the entire forward run and reverse run, counting pulses are fed to the counter device 23, whereby corresponding to the transportation sense of the magnetic tape, the operation mode "forward counting and backward counting" automatically were set by the derivation of the control signals from the inputs 48, 49 of the rotation speed control device 13.

From the reversing point 58 the magnetic tape again is driven in the forward motion direction, whereby upon reaching the counter condition "0" on the one hand the signal lamp is turned on as a marking and on the other hand the monostable multivibrator 53 is actuated. By doing this the user has noted whether time correspondence and agreement has occurred between the light emission of the signal lamp 28 and the sound event. If this is not the case, analogously to the embodiments with respect to the example according to the previously Figures, by means of the correction buttons "+" or "−" 33, 34, the marking, and respectively, the counter condition, by which condition the signal lamp 28 is turned on, is to be shifted.

By means of the AND-gate 52 the condition is taken into consideration that the signal lamp 28 and the multivibrator monoflop 53 can be switched on and actuated, respectively, solely in the forward running direction of the magnetic tape. If the AND-gate were not present, then even with the reverse running of the magnetic tape upon reaching the counter condition "0" the signal lamp would light up, and respectively, the monostable multivibrator (monoflop) 53 would be activated, whereby it would not be guaranteed that the actual beginning of the sound event can be recognized.

By the utilization of timing members (monoflops 53 and 57) in a simple manner a counting device 23 can be used, which, counter 23 merely has one output, namely, for example, the counter output "0".

For the positioning of the magnetic tape with respect to a reference point fixed on the device, such as the playback head or recording head, the positioning, that is the transport of the magnetic tape can be performed, with substantially lower speed than with normal operation of the device, in order to guarantee that, for example, the magnetic tape actually with the located position is stopped or the like. For this purpose a positioning button can be provided on the device. With this button not only is the setting of the magnetic tape provided, but also the change over of the rotational control device 13 to an extra slow or crawling speed is provided.

While there have been disclosed several embodiments of the invention is to be understood that these embodiments are given by example only and not in limiting sense.

I claim:

1. A method for coordination of a location signal to a sound event stored on a magnetic tape in a magnetic tape device, particularly for ascertaining the precise location of the beginning and/or end of the sound event on the tape with respect to a reference point on the tape device, comprising the steps of
    starting the playback of the tape which contains the sound event from a point before the sound event,
    upon hearing the sound event activating a counter to set it to count condition zero and via the counter initiating a detectable location signal automatically when the counter is at the count condition zero and simultaneously causing the counter to count forward with counts of the counter being dependent on the length of tape being transported by the tape device,
    subsequently reversing the magnetic tape to travel back at least to the sound event and causing the counter to count backwards dependent on the transported length of the tape in the reverse direction,
    repeating playback of the tape together with operation of the counter to count forward, causing the location signal to occur automatically when the counter reaches the count condition zero and the sound event to occur when the sound event plays on the tape device,
    perceiving and estimating the time relationship between the played back sound event and the occurring location signal,
    changing a count condition of the counter based on the perceived and estimated time relationship between the sound event and the location signal so that a subsequent occurrence of the location signal is shifted vis-a-vis the played back sound event during a subsequently repeated playback step,
    repeating the perception and estimation, changing, reversing and repeating playback steps so as to progressively shift the then occurring location signal vis-a-vis the then played back sound event until the location signal and the played back sound event are perceived as substantially concurrent by the user and are thereby correlated, and
    positioning the sound event on the magnetic tape with respect to a reference point on the tape device using the correlated location signal.

2. The method as set forth in claim 1, wherein the location signal is a light signal.

3. The method as set forth in claim 1, wherein the step of reversing occurs automatically after a predetermined count after the count condition zero.

4. The method as set forth in claim 1, wherein the step of repeating playback occurs automatically upon a predetermined count value.

5. The method as set forth in claim 1, wherein the step of reversing occurs automatically after a predetermined time after the count condition zero.

6. The method as set forth in claim 1, wherein the step of repeating playback occurs automatically upon a predetermined time after the count condition zero.

7. The method as set forth in claim 1, wherein
    said step of changing the count condition is performed stepwise.

8. The method as set forth in claim 1, wherein
    said step of changing the count condition is performed in the sense of shortening the time interval between the location signal and the sound event.

9. The method as set forth in claim 1, further including the step of providing a substantially lower speed than the playback transport speed for the step of positioning of the magnetic tape.

10. The method as set forth in claim 1, wherein the counter is positively coupled with the drive device for the tape during all operational modes.

11. A device for carrying out a method for coordination of a location signal to a sound event stored on a magnetic tape in a magnetic tape device, particularly for ascertaining the precise location of the beginning and/or end of the sound event on the tape with respect to a reference point on the tape device, comprising the steps of starting the playback of the tape which contains the sound even from a point before the sound event, upon hearing the sound event activating a counter to set it to count condition zero and via the counter initiating a detectable location signal automatically when the counter is at the count condition zero and simultaneously causing the counter to count forward with counts of the counter being dependent on the length of the tape being transported by the tape device, subsequently reversing the magnetic tape to travel back at least to the sound event and causing the counter to count backwards dependent on the transported length of the tape in the reverse direction, repeating playback of the tape together with operation of the counter to count forward, causing the location signal to occur automatically when the counter reaches the count condition zero and the sound event to occur when the sound event plays on the tape device, perceiving and estimating the time relationship between the played back sound event and the occurring location signal, changing a count condition of the counter based on the perceived and estimated time relationship between the sound event and the location signal so that a subsequent occurrence of the location signal is shifted vis-a-vis the played back sound event during a subsequently repeated playback step, repeating the perception and estimation, changing, reversing and repeating playback steps so as to progressively shift the then occurring location signal vis-a-vis the then played back sound event until the location signal and the played back sound event are perceived as substantially concurrent by the user and are thereby correlated, and positioning the sound event on the magnetic tape with respect to a reference point on the tape device using the correlated location signal, with at least one drive device for the transport of the magnetic tape in forward running and reverse running directions, and a control device for automatic playback—repeat operation for at least a partial range of the magnetic tape, is coordinated to the drive device for the magnetic tape and with a playback amplifier for the sound event, the amplifier being connected to a sound head, comprising;
a memory having a storage content correlated to amount of tape transported,
a switching-on means for bringing the storage content of said memory in relationship with the sound event with respect to the amount of tape transported from a time when the switching-on means is actuated,
signal means for providing the location signal,
means for transforming a storage content into a control signal for activation of said signal means, and
changing means for varying of the storage content of the memory by the user with respect to the tape position of the sound event, said changing means is operatively connected with said memory.

12. The device as set forth in claim 11, wherein
said transforming means is for transforming the storage content into the control signal at the moment of actuation of the switching-on means and when subsequently said storage content is reached during the playback—repeat operation.

13. The device as set forth in claim 11, wherein
said changing means is for the arbitrary varying of the storage content by the user with respect to the tape position of the sound event.

14. The device as set forth in claim 13, wherein
said changing means is for the step by step varying of the storage content by the user with respect to the tape position of the sound event.

15. The device as set forth in claim 11, wherein
said memory comprises means comprising a counter for counting in relationship to the amount of tape transported,
said switching-on means for setting the counter to the count condition zero and activating said counter,
a drive reversing means for reversing the tape is operatively connected to the control device,
means for operatively coupling said counter with the tape transport for reversing the counter corresponding to the tape,
said counter has a first output associated with a first count condition, said first output being connected to said drive reversing means for controlling said drive reversing means,
said counter has a second output associated with a lower count condition than the count condition zero, and said second output is connected to to said drive reversing means for control thereof,
said counter has a third output associated with the count condition zero, the count condition zero being between the first and second count conditions, said third output is connected to said signal means for activating said signal means upon reaching the count condition zero.

16. The device as set forth in claim 15, further comprising
a pulse delay stage is coordinated to each input of said drive reversing means,
said changing means constitutes means for correction of non-correspondence in time of the location signal with the sound event, said changing means is activatable during the delay time of the pulse delay stage.

17. The device as set forth in claim 16, further comprising
light signal source means for being activatable over the time period of the delay time of said delay stage, said light signal source means for indicating the possibility of correction of the coordination of the location signal to the sound event.

18. The device as set forth in claim 15, further comprising
playback means including the playback amplifier for playing the sound event recorded on the tape,
turning-on means for activating the playback means,
said second output is connected to said turning-on means.

19. The device as set forth in claim 11, wherein
said memory comprises means comprising a counter for counting in relationship to the amount of tape transported,
said switching-on means for setting the counter to the count condition zero and activating said counter,
a drive reversing means for reversing the tape is operatively connected to the control device, means for operatively coupling said counter with the tape transport, for reversing the counter corresponding to the tape, said counter has an output associated with the count condition zero, said output is operatively connected to and for triggering said signal means for the location signal, a first timing means is operatively connected to said output and for being triggered by the output of the counter upon reaching the count condition zero, a second timing means, said first timing means having a first timing means output with an output signal connected to and triggering said second timing means, control means for controlling playback-repeat operation, said control means is connected to the control device, said first timing means output is connected to said control means for feeding said output signal to said control means for initiating a drive reversal of the magnetic tape, said second timing means has a second timing means output with an output signal connected to said control means for controlling the playback-repeat operation of the magnetic tape.

20. The device as set forth in claim 19, wherein said first and second timing means are electronic timing elements.

21. The device as set forth in claim 10, wherein said first timing means has a shorter time constant than the time constant of said second timing means.

22. The device according to claim 21, wherein the time constant of said first timing means is half the time constant of said second timing means.

23. The device as set forth in claims 15 or 19, wherein said changing means constitutes means for setting said counter for correction of non-correspondence in time of the marking signal with the sound event, said setting means for changing the count condition of said counter.

24. The device according to claims 11, 15 or 19, further including means for operatively feeding the location signal for positioning of the magnetic tape as a control signal to the control device for the drive device, the latter constituting transport devices for the magnetic tape.

25. The device according to claim 11, further comprising a recording- and/or playback-head of the magnetic tape device constituting the reference point on the tape device for the location signal for positioning of the sound event with the magnetic tape with respect thereto.

26. The device according to claim 11, further including means for providing a substantially lower speed for the positioning of the magnetic tape than the playback transport speed.

* * * * *